Patented May 9, 1939

2,157,485

UNITED STATES PATENT OFFICE 2,157,485

FOOD PRODUCT AND METHOD OF MAKING IT

John Hood Forkner, Fresno, Calif., assignor to J. C. Forkner, Inc., a corporation of Nevada No Drawing. Application April 3, 1939, Serial No. 265,796

6 Claims. (Cl. 99—100)

This application is a continuation-in-part of my co-pending application Serial No. 256,456, filed February 15, 1939.

It is a primary object of my invention to produce a fig fruit mixture to be used in association with baked dough products, such as a filler for fruit bars, in which certain desirable characteristics of the fig are present but in which the identity of the fig is lost, and the flavor and color of other fruit or fruits predominate. By my invention numerous fruits, including pineapples, dates, oranges, apples, cherries, prunes, and others, may be used as the predominating fruit in a filler for fruit bars. Attempts to use such fruits as fillers for fruit bars have not been completely successful prior to my invention for reasons which I will later explain. Figs are the only fruit which have been completely successful for that purpose.

While ideally adapted for use as a filler for fruit bars or as a topping or coating spread on dough and baked therewith or evenly distributed throughout a mass of dough and other associations with baked dough because of its remarkable property of adhering to a baked dough surface, the novel fig fruit mix of my invention has other uses such as a binder or gum for coatings on the tops of cookies and the like; it may be used alone or in admixture with other suitable substances as a jam, jelly or preserve or spread for sandwiches and the like; it may be employed as a component in such products as frozen foods, ice creams and custards; it may be used in the making of fruit beverages; it may be employed as a center or filler in chocolates and other confections; and is capable of many other uses which would be apparent to those skilled in the art.

More specifically, it is an object of my invention to produce a fig fruit mixture by mixing ground and finely milled figs wherein all traces of the seeds and stems have been obliterated, or from which the seeds and stems have been removed, with other fruits as mentioned.

By milling the figs fine, somewhat approaching the fineness of flour, the seeds and stems are pulverized, the flavor of the fig is changed, the water carrying properties of the milled fig is greater, it lightens in color, will receive coloring matter more easily and retain it better, and will receive flavoring matter more quickly and retain it longer, than when coarsely ground.

It is another object of my invention to produce a fig material to be used as a base for fruit and other food mixtures by preferably first grinding the figs, and then milling them until the seeds and stems have been pulverized, and have become merged with the finely ground skins and meat into a homogeneous mass, having the characteristics described.

Either fresh or dred figs may be used. For my purpose it does not matter whether the seeds and stems are removed, or crushed. The principal purpose of removing or obliterating the seeds and stems is to conceal the identity of the fig.

I preferably first chop and grind the figs in the present conventional or any other suitable manner. The paste thus made contains seeds and stems in large quantities, as the chopping and grinding is too coarse to have much effect on them.

The fig paste is then milled in any suitable roll mill or by any other available means until the seeds and stems are pulverized and thoroughly dispersed through the mass. This milled fig pulp is to be used as a base, stabilizer and binder for the fig fruit mixture.

I then mix this fig pulp with other fruit or fruits and, if desired, add coloring and flavoring matter corresponding to the fruit which is to characterize the mixture.

Thus as an example of one of my principal fig fruit products, I may mix crushed pineapple and my fig pulp in such proportions that the color and flavor of the pineapple will predominate, and characterize the mixture to the consumer. The identity of the fig is lost, its color and flavor is subordinated to that of the pineapple, and yet it imparts to the mixture the qualities which render it an excellent filler for pineapple bars. If necessary or desirable, coloring matter and pineapple flavoring may be added to the mixture to improve its appearance and subdue any traces of fig flavor remaining.

Other fig fruit mixtures may be prepared in a similar manner, using the fruits mentioned above, or any other fruits, with or without the addition of coloring and flavoring matter. I employ the term fruits in its broad meaning. Within the spirit of my invention I may make a mixture of my fig pulp and flavoring matter, adding coloring matter if desired, without including other fruits. I may also combine it with nut paste, cereals, cerelose, dextrin, or any other edible substance the flavor of which will predominate over any fig flavor present.

In whatever manner used, as previously described, my fig pulp combines with the other substances to make what the bakers call a long filler, as contrasted to a short filler. A long filler is cohesive and will flow, while a short filler tends to break apart, and has little continuity of flow.

This is extremely important in the manufacture of fruit and baked dough products such as fruit bars and is one reason why fig bars are the only kind of filled cookies now manufactured in large quantities. Fig paste is a long filler, and will flow through the roller mills and paste dies of fig bar machines. It is viscous and sticky, enabing the rollers, with aid of scraper knives, to build up the necessary pressure for delivery of the paste.

In contrast to this, pineapple and many other fruits are short fillers, and cannot be satisfactorily put through the roller mill of a fig bar machine. None of them equals the fig in this respect.

The mixing of my fig pulp, which is to be distinguished from the present commercial fig paste, with such fruits as pineapple, dates, berries, oranges, apples, cherries and prunes, creates a long filler which will for the first time permit the manufacture of numerous varieties of fruit and dough products such as fruit bars by the same manufacturing methods, subsequent to preparation of the filler, now employed for making fig bars.

When used as fillers for example, fig fruit mixtures made according to my invention have several favorable characteristics which are lacking in whole or in part in fillers composed of fruits other than fig, either alone or mixed with stabilizers and binders heretofore employed:

1. They will better hold the dough coating around the filler.
2. They will better hold moisture in the filler.
3. The dough coating will not as easily absorb the moisture out of the filling.
4. They will not lose moisture rapidly in general evaporation.
5. They will not bleed at the ends.
6. They will not bake in the baking process.
7. They will not turn as dark in baking or thereafter.
8. They will not break down after a period and run out of the cookie.

In contrast to this I will point out some of the deficiencies as a filler for fruit bars of fruit mixtures made by combining fruits other than figs with commercial stabilizers and binders heretofore available.

| Stabilizer and binder | Principal deficiency |
| --- | --- |
| Agar | Will not stick to dough. |
| Pectin | Bleeds. |
| Gum Arabic | Dough absorbs moisture. |
| Potato flour | Cookies stick together and coating breaks up when packed together. |
| Psyllium | Breaks down in a short period. |
| Tapioca | Dries out in relatively short time. |
| Wheat flour | Bakes. |
| Rice flour | |
| Dextrin | Has strong flavor, will not stick to dough, only small amount can be used. |
| Starch | |
| Lard or similar fatty substances. | Greasy, will not feed suitably through conventional roller mill machines. Rancidity. |

None of them has the fibrous composition of natural fruit, and some of them, in addition to lard, are greasy and slippery.

My fig pulp supplies all of the enumerated deficiencies. It is of a light or buff color when made with white figs, rendering it susceptible to being colored by the coloring matter in other fruits or by artificial coloring matter, it has a substantially neutral or minor flavor and which is easily subordinated to a predominating flavor of another fruit, or a natural or artificial fruit or other flavoring, it is cohesive, viscous, and sticky, having some features corresponding to rubber, attributable to its rubber heritage, it has hygroscopic properties enabling it to retain relatively large amounts of moisture for long periods of time whereby color, flavor and consistency is indefinitely retained, and it is less affected by baking than most other stabilizers and binders. A substantial saving in total cost may be realized because figs are procured more cheaply than most other fruits. It acts as a stabilizer in retarding or hindering chemical changes in the body of other fruits. It acts as a binder for the other fruits, probably because its fiber, and stickiness are present in gums allied to rubber.

To summarize:

If the seeds and stems are left in the ground fig paste, which is now the commercial custom of preparing fig paste for fig bars, bakery, and confectionery purposes, and said paste is mixed with other fruits, the result is that the consumer will believe it to be a fig product, whereas if the seeds and stems are pulverized and commingled with the skins and meat by milling, and this fig pulp mixed with other fruits, the fig pulp of the fruit mixture takes on the flavor and color of whatever fruit it is mixed with almost perfectly and a harmonious blend is made, and the resultant product, herein referred to as a fig fruit mixture, is a much better product in most cases than the original fruit with which the fig pulp has been mixed because the fig has added hygroscopic and other valuable characteristics which many other fruits do not have. The fig adds body, stability, and food value. In the making of baked dough and fruit products as for example fig bars, which are also known as filled cookies, wherein the dough is wrapped around the filler and baked in that manner, practically all fruits other than the fig, in the baking process, will give up their water contents more easily and more quickly, the dough will more easily absorb the moisture from the filler of fruits other than the fig, often spoiling the appearance of the cookie and causing them to stick if packed together, and it has been impractical to make fruit bars of fruits other than the fig because of these characteristics. Especially is this true when the products are shipped considerable distances. I have found that by mixing the fig pulp with these other fruits and adding those particular characteristics which the fig has and such other fruits do not have, such as the hygroscopic characteristic and the gums which are inherent in the fig attributable to its rubber heritage, that it gives these other fruits the quality of sticking to the dough and holding their moisture better in baking. When the seeds and stems are removed or pulverized the finely milled fig loses its appearance as a fig, and will blend with any other fruit, and will be dominated by the flavor of other fruits.

Bakers presently using figs as a binder or gum for their coatings on the tops of cookies and cakes will find my fig pulp more suitable for their purpose.

As explained above, the novel milled fig pulp of my invention may be combined with practically all other fruits and equivalent substances and the proportion in which it is preferably employed in the mixture naturally varies according to the particular fruit or other substance selected. In most instances a proportion of fig pulp somewhere within the range of approximately ten to sixty percent will produce a mixture suitable for most uses although greater or lesser proportions of the milled fig pulp may be employed and at the same time obtain efficient results. It is desirable to deliberately vary the percentage of fig pulp to regulate the consistency of the fig fruit mixture to best correspond with the use to which it is intended to be subjected. As for example, in the production of a mixture to be employed as a coating, topping, spread or the like, it may be desirable to employ a lesser proportion of fig pulp to obtain a mixture having less viscosity and a stronger flavor of the other admixed fruit than in the production of mixtures to be employed as fillers and the like.

The following specific formulas are suggested merely as illustrative of the obviously very great number of specific uses of the invention and are not intended to in any manner limit the broad scope of the invention as herein set forth.

*Example A*

In the production of date bars the following ingredients in the following proportions are suggested:

| | Parts |
|---|---|
| Pitted, macerated and ground dates | 70 |
| Finely milled figs | 15 |
| Invert sugar | 15 |
| Salt as desired | |
| | 100 |

*Example B*

In the production of orange, pineapple or berry bars the following ingredients in the following proportions are suggested:

| | Parts |
|---|---|
| Orange pulp preferably treated to remove terpines and containing about 22% water | 35 |
| Finely milled figs | 35 |
| Powdered sugar | 15 |
| Glucose | 5 |
| Invert sugar | 10 |
| Salt, flavor and color as desired | |
| | 100 |

*Example C*

In making a raspberry topping, spread or coating the following ingredients in the following proportions are suggested:

| | Parts |
|---|---|
| Raspberry jam | 60 |
| Finely milled figs | 25 |
| Powdered sugar | 15 |
| Salt, flavor and color as desired | |
| | 100 |

In the description of my method for preparing the fig pulp I have assumed the use of figs having seeds and stems. If seedless figs should be obtainable, and the stems are removed, or if the seeds and stems are entirely removed prior to milling, the milling operation need proceed only to the extent necessary to grind the skins and meat into a pulp, or may be dispensed with if the grinding is sufficient to destroy the identity of the fig and make a pulp of the character described.

The essence of my invention is the mixing of the finely milled fig, with the seeds and stems removed either by milling or otherwise, with these other fruits, carrying all the above noted characteristics which the fig has and which the other fruits do not have, which produces a fig fruit mixture which has not been done before, carrying in that fig fruit mixture all the good characteristics of the fig as explained.

Under some circumstances, I may desire to bleach the figs or pulp with bicarbonate of soda, peroxide, sulphur or by any other suitable treatment. Some bleaching agents, such as bicarbonate of soda, will also tend to neutralize the fig flavor. This step, if performed, may precede the milling operation or be performed thereafter.

My fig pulp can be used for fruit mixtures in the form of jams, jellies and preserves, as well as in beverages, frozen foods, and custards, and it contributes to these other food products many characteristics similar to those which it imparts to the fig fruit mixture which I regard as the principal product of my invention.

I claim:

1. A food product comprising a mass of baked dough and a cohesive, hygroscopic, and viscous fig fruit mixture adhering to the dough, said mixture containing fig pulp composed of finely milled figs in which the seeds and stems are pulverized and another fruit having a flavor predominating over the flavor of the fig.

2. A food product comprising a mass of baked dough and a cohesive, hygroscopic, and viscous fig fruit mixture adhering to the dough, said mixture containing fig pulp composed of finely milled figs free of seeds and stems and another fruit having a flavor predominating over the flavor of the fig.

3. A fig fruit mixture containing fig pulp composed of finely milled figs in which the seeds and stems are pulverized and the fig taste and appearance are substantially destroyed and another fruit having a flavor predominating over the flavor of the fig, the said mixture when added to a mass of dough and baked therewith having the property of adhering to the dough surface.

4. A fig fruit mixture containing fig pulp composed of finely milled figs free of seeds and stems and in which the fig taste and appearance are substantially destroyed and another fruit having a flavor predominating over the flavor of the fig, the said mixture when added to a mass of dough and baked therewith having the property of adhering to the dough surface.

5. The process of making a cohesive, hygroscopic, and viscous fig fruit mixture which when added to a mass of dough and baked therewith has the property of adhering to the dough surface which comprises grinding whole figs to a paste, milling the paste to a fineness at which the seeds and stems are crushed and pulverized and the skins, meat, seeds and stems form a homogeneous, gummy pulp, and mixing with the milled pulp a fruit other than fig.

6. The process of making a baked food product which comprises grinding whole figs to a paste, milling the paste to a fineness at which the seeds and stems are crushed and pulverized and the skins, meat, seeds and stem form a homogeneous, gummy pulp, mixing with the milled pulp a fruit other than fig whereby to form a fig fruit mixture having the property of adhering to a dough surface when baked therewith, applying the mixture to a mass of dough and baking the dough.

JOHN HOOD FORKNER.